US012761106B2

(12) United States Patent
Rosen

(10) Patent No.: US 12,761,106 B2
(45) Date of Patent: Oct. 13, 2026

(54) METHOD FOR LEAKAGE DETECTION

(71) Applicant: Rosenxt Holding AG, Stans (CH)

(72) Inventor: Hermann Rosen, Stans (CH)

(73) Assignee: Rosenxt Holding AG, Stans (CH)

( * ) Notice: Subject to any disclaimer, the term of this patent is extended or adjusted under 35 U.S.C. 154(b) by 449 days.

(21) Appl. No.: 17/767,491

(22) PCT Filed: Oct. 12, 2020

(86) PCT No.: PCT/EP2020/078576
§ 371 (c)(1),
(2) Date: Apr. 8, 2022

(87) PCT Pub. No.: WO2021/069735
PCT Pub. Date: Apr. 15, 2021

(65) Prior Publication Data

US 2023/0221206 A1 Jul. 13, 2023

(30) Foreign Application Priority Data

Oct. 11, 2019 (DE) ..................... 10 2019 127 409.5

(51) Int. Cl.
*G01M 3/24* (2006.01)
*G01M 3/00* (2006.01)
*G01M 3/28* (2006.01)

(52) U.S. Cl.
CPC ............ *G01M 3/243* (2013.01); *G01M 3/002* (2013.01); *G01M 3/2815* (2013.01)

(58) Field of Classification Search
None
See application file for complete search history.

(56) References Cited

U.S. PATENT DOCUMENTS 4,336,708 A * 6/1982 Hobgood ................ G01M 3/18 73/40.5 R
2007/0174451 A1* 7/2007 Huaguang .............. G01D 4/004 709/224
2013/0085690 A1 4/2013 Fei et al.
2014/0061962 A1* 3/2014 Lane ....................... B29C 70/54 264/40.3

(Continued)

FOREIGN PATENT DOCUMENTS

DE 112011100419 T5 11/2012
EP 3388811 A1 10/2018
WO WO 2017/005269 A1 1/2017

OTHER PUBLICATIONS

International Search Report for International Patent Application No. PCT/EP2020/078576, mailed Jan. 19, 2021.

(Continued)

*Primary Examiner* — John E Breene
*Assistant Examiner* — Alex T Devito
(74) *Attorney, Agent, or Firm* — Sheridan Ross P.C.

(57) ABSTRACT

The invention relates to a method for leakage detection on an object flown through by a medium, in particular a pipe or a pipeline. According to the invention, a pattern is identified in the determined values for the change of the flow rate and the pressure of the medium and for a temperature change, and a probability for the presence of a leak is determined based on the identified pattern and due to self-learning systems.

13 Claims, 3 Drawing Sheets

(56) References Cited

U.S. PATENT DOCUMENTS

| | | | | |
|---|---|---|---|---|
| 2016/0163177 | A1* | 6/2016 | Klicpera | E03B 7/071 137/59 |
| 2016/0356666 | A1* | 12/2016 | Bilal | G01M 3/2807 |
| 2018/0293723 | A1 | 10/2018 | Bae et al. | |
| 2019/0154539 | A1 | 5/2019 | Banerjee et al. | |

OTHER PUBLICATIONS

Written Opinion for International Patent Application No. PCT/EP2020/078576, mailed Jan. 19, 2021.
Nasteski, Vladimir "An Overview of the Supervised Machine Learning Methods" HORIZONS.B.4 51-62. 10.20544/HORIZONS.B.04.1.17.P05; Dec. 2017.

* cited by examiner

METHOD FOR LEAKAGE DETECTION

CROSS-REFERENCE TO RELATED APPLICATIONS

This application is a national stage application under 35 U.S.C. 371 of PCT Application No. PCT/EP2020/078576 having an international filing date of 12 Oct. 2020, which designated the United States, which PCT application claimed the benefit of German Application No. 10 2019 127 409.5, filed 11 Oct. 2019, each of which are incorporated herein by reference in their entirety.

The invention relates to a method for leakage detection according to the preamble of claim 1 and to a computer program product according to the preamble of claim 12.

If leaks occur on pipelines, it is often of great economic importance to detect, find and seal the leak quickly and safely. In particular in the case of pipeline systems that—typically divided into pipeline segments—have parts extending between continents and transport large amounts of potentially environmentally harmful products, for example crude oil, it is generally also of great ecological importance to quickly seal a leak that occurs.

On the basis of the principle of conservation of mass, known methods for leakage detection generally fundamentally involve a mass flow balance being formed. In principle, the amount of a transported fluid that enters a pipe section should also emerge from the end of said pipe section again completely, provided that there is no leak in the relevant section. Under idealized conditions, an imbalance in the entering mass flow and the exiting mass flow therefore indicates that there is a leak.

The exact position of the leak along the relevant pipe section may not readily be ascertained in this manner, however. In addition, this idealized principle may be applied to real pipeline systems only inadequately. In particular the influence of different environmental factors is problematic. Owing to the sometimes considerable length of the pipelines or pipeline segments of several thousand kilometers, sections of for example large pipelines often run through multiple climate zones. Most notably temperatures along the pipeline that differ on a region-by-region basis and, in addition, change over time are a sometimes considerable interference quantity for ascertaining a mass flow balance, depending on the product that is transported.

Owing to the thermal expansion of the fluid that is transported, which is dependent on the individual product in each case, the mass flow balance may turn out to be negative or even positive even without a presence of a leak. The natural volume of the pipeline provides for a certain buffer effect in this case. If a pipeline runs through colder regions, the fluid transported will contract in these areas. A similar effect is produced by short-term local changes in the ambient temperature of the pipeline, for example as a result of precipitation or owing to different levels of shielding of the ground from sunlight because of the tilling and harvesting of fields in the case of agricultural land use above the pipeline. If this effect is ignored when ascertaining the mass flow balance, a loss of the transported fluid is registered even though there is no leak.

From an economic perspective, it is almost impossible to fully monitor a pipeline network having a great total line length and a complex ramification structure, for example, in respect of all the relevant factors. A leak that occurs is thus rarely detected immediately by sensors. Furthermore, environmental factors and the thermodynamic properties of the medium cannot usually be detected to an adequate degree in order to be able to make exact statements regarding correction of the mass flow balance ascertained for a measurement section. For this reason, various approaches are known in order to make allowance or compensate for fluctuations that occur by way of statistical handling of ascertained data. This is intended to improve the identification of leaks under real conditions.

In order to make allowance for thermodynamic changes along the pipeline or the transported fluid, the approach of modeling processes that occur and relevant influencing factors by way of a realtime model is pursued, for example. Corresponding methods are known by the name "Real Time Transient Model" (RTTM), for example. In some cases, known methods also permit the leak to be located in a specific area, for example by detecting propagating pressure waves that appear when a leak occurs.

It is always disadvantageous in this case, however, that the reliability of the results ascertained by statistical means is often low. This applies in particular if only a comparatively small amount of data is available or a single measurement needs to be evaluated. The high economic and ecological and also safety-relevant risk in the event of a leak that is mistakenly not detected means that, when there is doubt, the decision made is usually to perform a manual inspection of the relevant pipeline section. This often requires a team of service engineers to venture over long distances into challenging terrain, for example in order to inspect an overland pipeline. It is understandably desirable to avoid the associated risks to human beings and the environment and in some cases considerable costs.

Against this background, it is an object of the present invention to improve the reliability of leakage detection on the basis of ascertained data.

The aforementioned object is achieved by a method according to patent claim 1 and by a computer program product according to claim 12. Advantageous developments are in each case the subject matter of the dependent claims.

The method according to the proposal first involves a series of values being ascertained that form the basis for the subsequent evaluation. The values comprise at least a change in the flow rate and a pressure change in the product or medium transported by an object carrying a flow and also a temperature value change. Structurally, the object carrying a flow, which is in particular a pipe or a pipeline, is divided into one or more measurement sections. The method involves a plurality of measurement points now being defined on each measurement section. Preferably, one measurement point each is arranged in the initial area and in the final area of the measurement section. Values for the aforementioned physical quantities and, if necessary, for further physical quantities are now ascertained at each of the measurement points.

The desired values may be ascertained by way of direct and/or indirect measurement of the physical quantities. As high a, in particular temporal, resolution of the recording as possible is advantageous in this case. Alternatively or additionally, however, data generated in another manner, in particular simulated, may also be applied as a value to the method according to the invention, or assigned to a measurement point.

It is self-evident that, according to the invention, as an alternative or in addition to ascertaining an absolute value for the relevant quantities, a relative value and the change in the applicable quantities may also be ascertained in each case. The change, in particular over time, provides information about the dynamics of processes that occur and is thus of greater importance for the method than the mere absolute value of a quantity.

Preferably, the assessment of whether or not there is an unwanted loss of volume of the medium is essentially not based on any static considerations of the actual state. Instead, the method according to the invention involves in particular the use of a dynamic model. For that reason, primarily the change in the ascertained quantities, in particular over time, is of great importance.

The change in the flow rate of the medium, i.e of the fluid transported in the object carrying a flow, is in particular mass-based, but may also be understood as volume-based. Furthermore, the pressure change may relate to the hydrostatic pressure and/or the dynamic pressure. The underlying temperature value, or the change therein, relates in particular to the ambient temperature at the measurement point, but may alternatively or additionally also directly reflect the change in the temperature of the medium at the measurement point. The recording of pressure and temperature changes is of comparatively great importance, since the flow of the medium generally changes greatly depending on an existing temperature gradient and/or pressure gradient.

Beyond the cited physical quantities, it is furthermore also possible to ascertain values for further quantities, for example for the rate of flow of the medium or the density thereof or for the external ambient pressure in the area of a measurement point.

If actual measured values are not available or are available in too small an amount, it may be possible to interpolate values for the desired quantities on the basis of measured values from the adjacent or neighboring measurement points.

As an alternative or in addition to an actual measurement, the values at the measurement points may also be ascertained in particular by way of modeling. In particular the object carrying a flow is modeled in this case, preferably including the flowing medium. This allows for example the occurrence of specific values for the physical quantities of interest to be simulated, which means that their effects on the object carrying a flow and/or on the medium may be ascertained on the basis of the underlying model.

Usually, both measured values and values ascertained by way of modeling or simulation may fundamentally be subject to an uncertainty, i.e. a random and/or systematic error. For this reason, statements may be made using the method according to the invention, in particular in the form of probabilities.

Instead of a realtime model or in addition to one such, values may also be generated by way of forward modeling. This involves in particular an iterative method being employed, by way of which the values available at a measurement point and the effects of such values are predicted. The number of iteration steps may fundamentally be chosen according to what demands are made on the accuracy of the calculation in individual cases.

In a preferred configuration of the modeling employed, a possible trend for the overall system and/or for individual parameters may be approximated inter alia by ascertaining conditional probability values. In this context, in particular methods of Bayesian statistics and/or estimation methods, such as a maximum likelihood approach, may be included.

In particular, it is possible for ascertained, modeled and/or simulated data to be modeled in a one-dimensional model of the object carrying a flow, preferably a pipeline or a pipeline system, in a simplified manner. This may be accompanied by an in particular selective reduction of data to a specific extent and/or by way of targeted combination of data. This may moreover be based on a weighting in order to stipulate the extent to which the data used are adopted in the model or influence the modeled result. In general, a corresponding simplification down to a one-dimensional model permits considerably simplified and thus more reliable detectability of the critical effects that need to be observed.

It is self-evident that a higher-dimensional model and/or a combination of multiple one- and/or higher-dimensional models may also be employed in a comparable manner. In principle, the reproduction or use of the normally extensive available data for a largely simplified model is advantageous in respect of the method according to the invention. An accordingly reduced representation of the present situation, or the likely future trend therein, permits highly reliable detection or rating of irregularities in regard to the state and/or the operation of a pipeline system, in particular for a user. What level of simplification is ultimately sought in this case may be defined in particular on the basis of the specific application situation in individual cases.

A realtime model and/or forward modeling of the state of the considered object carrying a flow may preferably be used to determine an optimum value for the spatial and/or temporal density of the measurement points for capturing the data that are to be taken into consideration. The measurement point density is in particular inhomogeneously distributed over the entire considered object carrying a flow, or a specific measurement section. The ascertainment of an optimum density allows an adequate amount of data for rating the present and/or future state to be collected locally and/or, in relation to events, over time without, as a result of unnecessarily redundant capture, generating a surplus of data volume, the transmission, storage and processing of which is time-consuming and costly. If for example the particular need for reliable assessment of possibly critical situations in high-risk areas means that there is provision for a higher density of measurement points locally, the modeling permits a respective economically optimum degree to which adequate data collection takes place to be determined in this regard.

If values for the underlying physical quantities are ascertained at different measurement points of the measurement section, the method involves at least one group of values being formed from these values. The group of values may ultimately comprise the total set of recorded or otherwise ascertained values or may be formed by a subgroup of these values.

The ascertained values are supplied to a data processing device for evaluation. The data processing device may be a computer that is present locally close to the measurement section. A particular preference, however, is central processing of the data from different measurement points and/or measurement sections by a common data processing device. The data processing device may furthermore also be a network comprising multiple interacting computers. In particular, it is preferred for the data processing device to be provided at a physical distance from the measurement sections to be monitored, for example in a central computer center. The data processing may therefore also be performed on the basis of the principle of a cloud service, for example.

The group of values is examined by means of the data processing device for whether the values in the group of values form a pattern or a pattern is formed within the group of values. If a pattern is identified in the group of values by means of the data processing device, the pattern, in particular its type and the strength of its character, may be used to determine a likelihood of a presence of a leak in the measurement section of the object carrying a flow. This allows in particular heuristic leakage detection, with the result that leaks that occur in the measurement section under consideration may be detected even if an evaluation of the available data using known statistical methods does not deliver reliable results.

In particular, the method according to the invention may be used to distinguish between patterns that, on the one hand, involve a change of flow and/or a change of temperature of the medium as a result of environmental influences or that, on the other hand, are related to an unwanted loss of flow on account of a leak or illegal tapping. The aim in this case is to be able to react to the respective situation as quickly as possible in order to keep the loss of the transported medium as low as possible.

Preferably, a classification algorithm is applied to the group of values, or to a pattern identified in the group of values. A pattern that is present may therefore be not only identified but also rated in respect of categorization into different pattern classes. The classes are in particular related to the relevance of the pattern in regard to the possibility of a presence of a leak.

Alternatively or additionally, a pattern analysis algorithm may also be applied to the pattern, said algorithm—in a similar manner to a method for image recognition—interpreting the pattern on the basis of its qualities, in particular in order to ascertain what event is represented by the pattern and with what likelihood.

The data processing device is preferably designed accordingly in order to be able to execute such a classification algorithm and/or pattern analysis algorithm.

It is possible for the ascertained values to be stored in a database as a dataset. Such a dataset may be formed in particular by a group of values that is also used to carry out the evaluation for a pattern identification. Alternatively or additionally, it is preferred for an identified pattern to be stored in a database as a dataset and/or for such a pattern to be assigned to a dataset stored beforehand or in parallel. This allows such a pattern and/or the underlying values to be accessed again for a later analysis. In particular, a further analysis may be verified thereby.

If an evaluation of the values in a group of values that has been formed results in a pattern being identified and if one or more patterns is or are already stored in a database, the patterns may be compared with one another. Multiple stored patterns form a type of lookup table, in particular, in this case. A classification algorithm applied if necessary may preferably be used to determine with which of the stored patterns a newly identified pattern is compared. If the size of the database of stored patterns, which are preferably each associated with specific events, is sufficiently large, the present event may be identified quickly and reliably in this manner according to the principle of a fingerprint comparison.

Beyond an overall pattern comparison, it is alternatively or additionally possible for just individual characteristics of a specific pattern defined as being characteristic to be compared against a newly identified pattern. In this case, the characteristic pattern is used as a criterion for the presence of a leak in the measurement section of the object carrying a flow. The characteristic pattern may involve in particular averaged measured values relating to the presence of a leak. In addition, it is also possible to use generated data, i.e data modeled and/or simulated by computation, to produce the characteristic pattern. In this case, the characteristic pattern preferably corresponds to a pattern that ideally emerges in the ascertained values when there is a leak. Depending on the degree of match between the newly identified pattern and the characteristic pattern, the data processing device may be used to make a statement about the likelihood of a presence of a leak in the relevant measurement section. If a stipulated threshold value is exceeded in this case, this may be used in particular as a hard criterion for the presence of a leak, so that appropriate measures, for example a manual check or an emergency shutdown, may be initiated.

A particularly preferred configuration of the method according to the invention provides for the data processing device to be used to apply a learning algorithm to the ascertained values, or to the group of values formed from this. An algorithm with learning capability not only results in the method becoming more informative for the current application, possibly with every iteration, as is already the case with popular statistical methods. Rather, the learning algorithm is trained by any application and any processing of new data. Evolutionary effects increase the reliability of a self-learning system of this kind over time. There is therefore a drop in the error rate for the identification and in particular interpretation of patterns in the ascertained values.

Popular statistical methods for data analysis in respect of leakage detection are usually geared to compensating for fluctuations that occur in order to be able to read the desired information from the correspondingly adjusted data. In particular when an algorithm with learning capability is used for the data analysis, the method according to the invention allows leakage detection on the basis of the occurrence of appropriate patterns in the ascertained values even under conditions under which known methods fail. This may be the case for example if the values used have severe outliers, as a result of which approximations made during the statistical treatment are wide of the mark. By contrast, the method according to the invention involves the systematic application of empirical data to newly ascertained values. In particular the application of an algorithm with learning capability allows even events that are not detected by respective rigidly applied statistical algorithms to be identified on the basis of the pattern that emerges in the values.

In a particularly preferred configuration of the method, the ascertained values or the group of values that is formed is evaluated using an artificial neural network. The data processing device is preferably of appropriate design for this purpose.

The learning algorithm is preferably trained using stored values before being applied to the ascertained values or the group of values, said stored values relating to events that have really occurred, in particular the actual presence of a leak, or having been recorded in this context. Alternatively or additionally, the learning algorithm may also be trained on the basis of simulated values. Such simulated values have preferably been determined by simulating a leak on the object carrying a flow. Training in the aforementioned manner teaches the learning algorithm to relate specific combinations of values, or patterns in groups of values, to specific events. After suitable training, it is therefore possible to use the algorithm with learning capability, by way of appropriate configuration of a query, to identify a pattern in unknown or new values that relates to a specific type of event, in particular indicates that there is a leak in the measurement section under consideration.

From a design point of view, it is preferred if the values used for the method according to the invention, in particular for the change in the flow rate of the medium, in the pressure of the medium and/or in the temperature, are ascertained noninvasively in each case. This avoids introducing a measuring device, such as a sensor, into the interior of the object carrying a flow and thus influencing the flow of the medium inside. This would create the risk of distorting the measurement itself and hence also the later data evaluation. Appropriate measurement of the data is preferably carried out by means of a measuring device that is arranged on or in a shell of the object carrying a flow, for example the wall of a pipeline. In the case of the flow rate, a so-called clamp-on flowmeter is particularly suitable, which may detect the change in the flow of the medium inside the object carrying a flow from outside.

Particularly preferably, the change in flow rate is measured by means of an acoustic method. This involves the flow rate, or the change therein, being ascertained on the basis of the propagation behavior of acoustic signals, which are introduced from outside, in the flowing medium. An ultrasound-based method in which the injected acoustic signals have an appropriately high frequency has been found to be particularly suitable. In particular, the acoustic signals are injected contactlessly, i.e without a mechanical transducer externally influencing the wall of the object carrying a flow.

Although the group of values examined in accordance with the method in order to identify a pattern is formed from the values ascertained at the measurement points, it is not necessarily limited just to these values. It is additionally possible for further, in particular generally available, data to be included, or added to the group of values, for example regarding the present and/or forecast weather in the surroundings of the object carrying a flow. This may sometimes increase the significance of the results of the method according to the invention further.

In one preferred configuration of the method, ascertained values from different measurement points are transmitted to a central data processing device. The transmission in this case preferably takes place wirelessly.

The invention furthermore also comprises a computer program product for determining a likelihood of a presence of a leak on an object carrying a flow of a medium. The computer program product is designed in particular for performing the method for leakage detection according to the invention or for use in the method according to the invention. It thus comprises instructions for recognizing a pattern in a group of values, wherein the group of values is formed by values that are ascertained on a measurement section of the object carrying a flow and relate at least to a change in the flow rate of the medium, to a pressure change in the medium and/or to a temperature change.

The invention is explained below in more detail on the basis of exemplary embodiments. All of the features described and/or shown in the drawings each form independent aspects of the invention, regardless of their combination in the exemplary embodiments or in the dependency references in the claims.

In the drawings

FIG. 1 shows a typical application situation for the method according to the invention. An object 1 carrying a flow, in the form of a pipeline or a pipeline section for conveying a product in the form of an in particular fluidic medium, is laid outdoors partly above ground and partly below ground.

Figure 1:
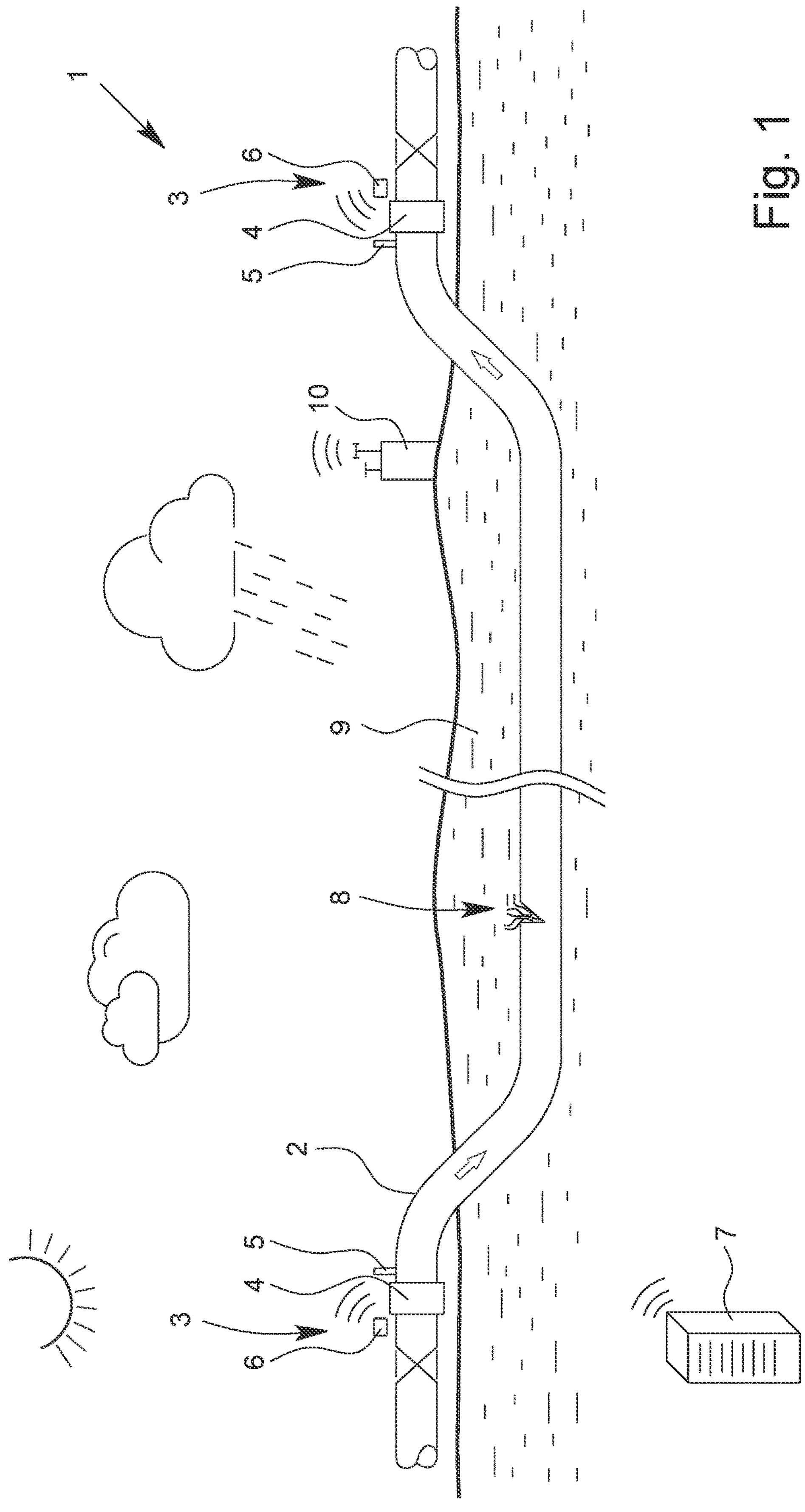
FIG. 1 shows a schematic representation of an illustrative application situation for the method according to the invention.

The detail shown represents a measurement section 2 of the considerably longer object 1 carrying a flow. The measurement section 2 is monitored by the method for leakage detection according to the invention. This is accomplished by ascertaining a value for various physical parameters at each of two measurement points 3.

As a departure from the two measurement points 3 shown, a measurement section 2 may also have a larger associated number of measurement points 3. It is furthermore certainly preferred, but not absolutely necessary according to the invention, for the measurement points 3 for various physical quantities to be arranged at the same positions along the measurement section 2 of the object 1 carrying a flow.

In general, the object 1 carrying a flow may be understood to mean an object that is fundamentally intended to have a medium flow through it. In this respect, it is fundamentally also possible in the invention to ascertain values relating to a measurement section 2 that does not have the medium flow through it continuously. Determination and/or prediction of environmental parameters, such as a change in the ambient temperature, may be of interest in regard to a forthcoming transportation of the medium through the measurement section 2, for example.

In principle, for all of the relevant physical parameters, it is preferred for the applicable values to be ascertained noninvasively where possible, i.e without the flowing medium being influenced by components introduced into the object 1 carrying a flow or the flow being disrupted in another way.

A value for the change in the flow rate of the medium is ascertained. This is performed in particular by a flowmeter 4. In the example shown in the present case, the preferred configuration of the flowmeter 4 is shown as a so-called clamp-on flowmeter, which is applied externally to the object 1 carrying a flow. The flow rate of the medium, or the change in said flow rate, may therefore be ascertained noninvasively. It is self-evident that any other type of flow measurement in principle may be useful for ascertaining values. The flow rate may be understood as referenced to the mass and/or the volume.

In the example shown, the flowmeter 4 is based on an acoustic principle for measuring the change in the flow rate of the medium. This involves acoustic signals, in particular in the ultrasonic range, being introduced into the medium through the wall of the object 1 carrying a flow, and their propagation speed being measured in order to draw a conclusion about the flow properties of the medium. Preferably, the acoustic signal is injected and/or the propagated signal is read contactlessly, i.e. without mechanical coupling of a transducer of the flowmeter 4 to the wall of the object 1 carrying a flow.

In addition, a value for the pressure change in the medium is ascertained at each measurement point 3. The pressure change is measured in particular by way of an appropriate pressure sensor 5.

Furthermore, a temperature change is ascertained in particular by means of a temperature sensor 6. This is in particular a value for the ambient temperature, or the change therein, at the location of the measurement point 3. Alternatively or additionally, a value may also be recorded away from the measurement point 3, for example between two measurement points 3 of a measurement section 2. In this context, such a value may be ascertained for the air temperature, the ground temperature, the temperature of the object 1 carrying a flow or of the flowing medium itself. In particular the influence of the ambient temperature on the medium in the object 1 carrying a flow along the stretch may therefore be taken into consideration.

The values, in particular ascertained by measurement, for the cited and, if necessary, further physical parameters are transmitted to a data processing device 7 in order to be subsequently evaluated further. The transmission is preferably effected wirelessly. It is self-evident that, alternatively or additionally, a wired transmission may also take place.

The data processing device 7 may, as indicated in the representation in FIG. 1, be a central data processing device 7 positioned at a location that is remote from the measurement section 2. The data processing device 7 may be in the form of a single computer, but also in the form of a network of multiple interacting computers. In addition, there may also be provision for a configuration of the data processing device 7 as a complex system having multiple computing units that operate in parallel and/or are hierarchically linked.

The data transmission from the measurement points 3 to the data processing device 7 may be effected in particular according to popular transmission standards, such as Bluetooth or WiFi, and/or via a mobile radio network. In addition, there is also the possibility of satellite-based communication between the measurement point 3, or the devices for ascertaining values provided at the measurement points 3, and the data processing device 7.

Furthermore, communication may take place between applicable communication devices at the measurement points 3. By way of example, this permits provision to be made for a powerful transmission installation, just at one measurement point 3 or at least at a few measurement points 3, in order to transmit the ascertained values to the data processing device 7. The at the individual measurement points 3 of the measurement section 2 are initially transmitted over comparatively short distances to a central measurement point 3 of this kind and from there are transferred to the data processing device 7. An appropriate design may also be realized by a separate relay station 10, which is not associated with a specific measurement point 3 but rather is situated in the surroundings of the relevant measurement section 2 and hence in range of the communication devices of all of the relevant measurement points 3.

One particular configuration of the method involves at least substantially exclusively data relating to the flow rate of the medium, or the change in said flow rate. These data are preferably delivered by flowmeters 4 and/or ascertained in a modeling.

Particularly preferably, a network of measurement points 3, or flowmeters 4, is furthermore used that extends at least over a portion of the object 1 carrying a flow, or of the measurement section 2. In this case, the individual measurement points 3, or flowmeters 4, preferably communicate with one another and/or with a data processing device 7 wirelessly, optionally using an interposed relay station 10. Alternatively or additionally, just as in other configurations of the method, there may also be recourse to standard mobile radio technologies and/or provision for satellite-based communication.

As will be explained in even more detail below, the transmitted data are evaluated as part of the method according to the invention by means of the data processing device 7 and examined for the presence of a pattern that indicates the presence of a leak 8 in the examined measurement section 2. If such a leak 8 is detected, or if a sufficient likelihood of a presence of a leak 8 is ascertained, appropriate measures may be taken in a short time to provide a remedy.

In the representation in FIG. 1, such a leak 8 is indicated in the section of the object 1 carrying a flow that runs below ground. The transported medium, which may be crude oil, for example, is getting into the soil 9 in an uncontrolled manner at the position of the leak 8 and may contaminate the groundwater there, for example. Besides the economic significance of a loss of the transported medium, such a leak 8 may entail serious ecological consequences. Extensive damage to the environment occurs not just in the case of catastrophic leaks 8 in which a large amount of the transported medium escapes in a short time. Rather, small leaks 8 that cause only a slow escape of the medium over time may also already be a great ecological hazard.

Figure 2:
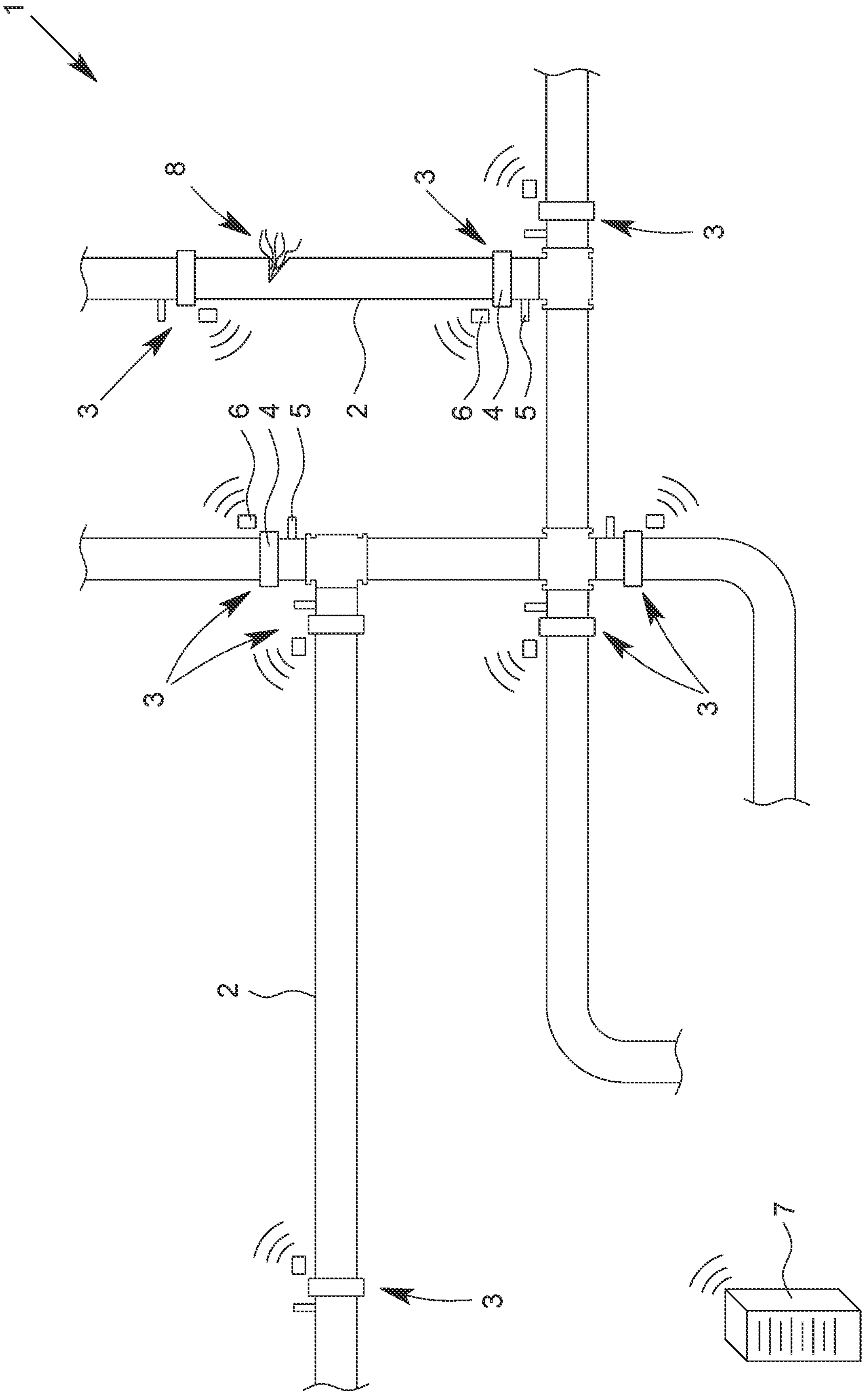
FIG. 2 shows a schematic representation of a further application situation for the method according to the invention and FIG. 3 shows a schematic illustration of the data processing for the method according to the invention.

FIG. 2 shows a further application situation for the method according to the invention by way of illustration. The object 1 carrying a flow is formed by a comparatively complex pipe network there. The detail shown is intended to represent an extensively ramified network of pipelines, in some cases of great length, purely symbolically. Apart from ramified networks of supply lines, some of which span great distances between different regions of the earth, a larger industrial installation, for example a refinery, may also comprise a comparatively complex pipe network. Various measurement sections 2 may be defined in such a highly ramified object 1 carrying a flow. A measurement section 2 is not necessarily defined only by the section of the object 1 carrying a flow between two measurement points 3, but may also comprise further areas, in which there is in particular provision for more than two measurement points 3. The definition of a measurement section 2 is ultimately dependent on from which measurement points 3 received values, or for which measurement points 3 ascertained values, are used for the evaluation by the data processing device 7.

If the ramification complexity of the object 1 carrying a flow is accordingly high, said object may then be monitored directly by applicable sensors only with difficulty. Similarly to in the case of a pipeline having a very great length, complete monitoring of the system ultimately founders on the costs that would arise for an appropriate number of sensors. In addition, the partial volumes, which are in each case fluidically connected to one another, in the various branches of the object 1 carrying a flow result in interactions and buffer effects when the transported medium propagates in the pipe network. This also hampers the evaluation of a mass flow balance.

The method according to the invention has an advantageous effect here by detecting interference events, such as the occurrence of a leak 8, in a specific measurement section 2 by identifying patterns in the ascertained values.

The influence of different temperatures on the behavior of the transported medium arises not only as it passes through various climate zones or on account of different weather conditions along a pipeline. In the example of an industrial installation too, it is usually the case that pipelines run along structures at different temperatures. For this reason, the temperature of the medium usually changes as it flows through the pipeline, or the pipeline network. The associated expansion or contraction of the medium significantly disrupts the ascertainment of a mass flow balance and hampers the detection of an actual loss of mass, for example on account of a leak 8 or on account of illegal tapping on the transport path.

In this regard, the method according to the invention in particular allows for the fact that various influencing factors usually affect the transported medium, in particular the prevailing pressure and/or flow rate conditions, on different timescales. Changes in the climatic or weather-related influences generally affect the medium in pipelines, in particular those running below ground, with a time delay, this being accompanied by a certain inertia in the reaction of the system. By contrast, desired tappings of the medium, for example by end consumers, especially lead to short-term and especially locally occurring fluctuations, which likewise need to be taken into consideration in an appropriate manner.

In particular desired, but unschedulable, tappings of the medium in a measurement section 2, for example by end consumers, may be modeled by way of appropriate local consumption measurements and included in the method according to the invention. To this end, there may be provision for suitable positioning of one or more measurement points 3, in particular comprising a flowmeter 4, in the vicinity of the known tapping point.

The aim of the method according to the invention is to distinguish patterns in the ascertained values that occur on the basis of temperature and volume fluctuations in the medium on account of external and internal influences from patterns that are related to actual loss of the medium from the object 1 carrying a flow on the transport path. The natural influences on the medium are varied and accordingly may be taken into consideration completely in popular statistical methods only with difficulty.

Fluctuations that occur are primarily related to a change in the temperature of the transported medium over time and in space—in particular along the object 1 carrying a flow. Although this is highly dependent on the ambient temperature, it is influenced by numerous other factors. Air and ground temperature are dependent on the insolation to different degrees and affect the temperature of the medium accordingly. By contrast, rain and cloud have a short-term cooling effect. In addition, in particular in the case of pipelines that run below ground, the biomass at the surface may have an effect on the temperature of the medium in the line, for example in the form of an insulating effect or by shielding the ground from sunlight. This factor is also subject to sometimes short-term changes, for example as a result of cultivation and harvesting on areas used agriculturally.

If the object 1 carrying a flow is of sufficiently great extent or accordingly complex ramification, such as a pipeline or a pipeline network, thermodynamic changes in the flow properties of the transported medium generally also invariably occur on account of internal effects. The reasons for this are for example the fluctuation or change in the flow resistance on account of the shape of the line. In particular if the transported medium is composed of various substances, a change in the composition may additionally occur. This may also affect the flow behavior of the medium.

Large pipelines or pipe networks may furthermore have a considerable natural volume that is initially filled during so-called "line packing", i.e charging the line with the medium and building up operating pressure, before the medium comes out again, or is tapped, at a particular point. A sufficiently large internal volume of the object 1 carrying a flow additionally leads to buffer effects, even during operation, that allow volume-related changes in the medium to be registered only indirectly. Without further consideration of internal and/or external parameters, it is thus hardly possible to draw meaningful conclusions from a comparative measurement of the flow rate, or the change therein, at the input and the output of a measurement section 2 of the object 1 carrying a flow.

Extensive tests have shown, surprisingly, that different types of patterns may form in the ascertained values. Some natural fluctuations may not be completely eliminated by means of popular statistical methods, even after the environmental parameters have been included, but lead to patterns in the data. These are distinguished from those patterns that may be observed in the event of an actual loss of mass, for example owing to a leak 8, a line break or an illegal tapping of medium on the transport path.

This is the starting point for the invention in that these two types of patterns are identified and distinguished from one another. As already mentioned, the method involves the data processing device 7 being used, during or after the evaluation of the ascertained values for the change in the flow rate, in the pressure and in the temperature and, if necessary, in further physical quantities, to look for a pattern in these values.

Figure 3:
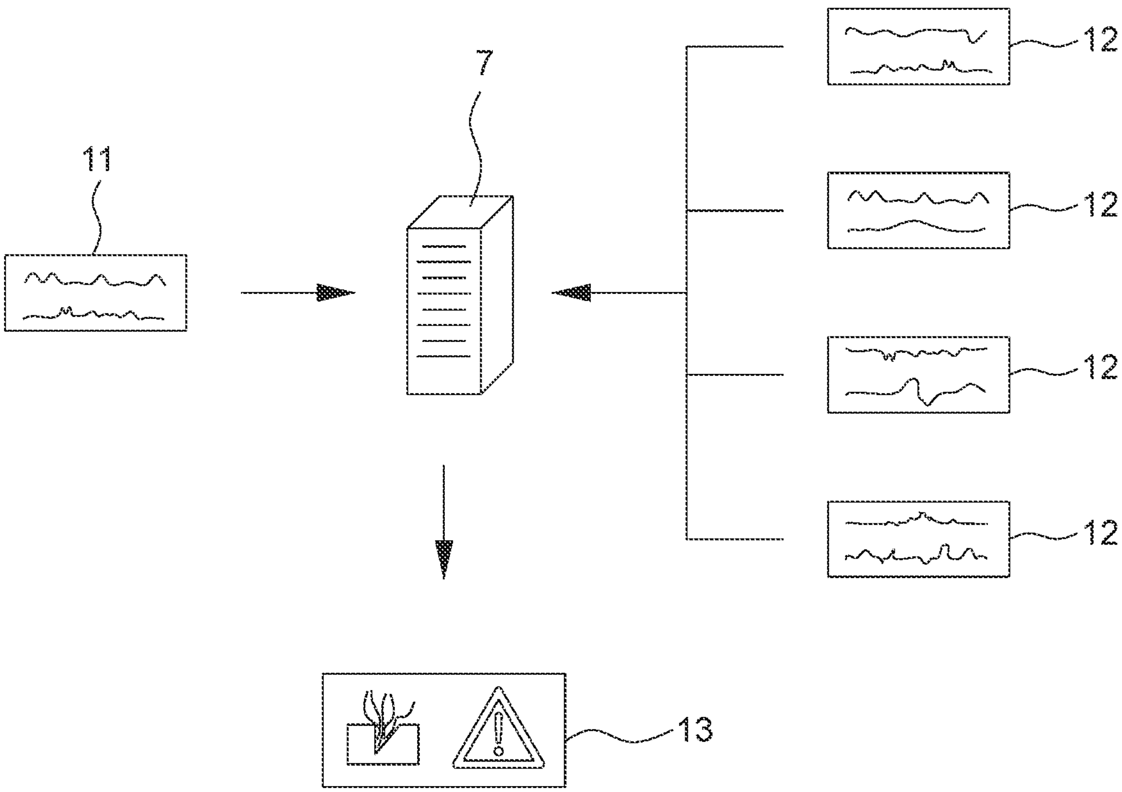

The representation shown in FIG. 3 illustrates the basic sequence for the evaluation of ascertained values by the data processing device 7 for leakage detection. A group of values 11 is initially formed from the ascertained values and is analyzed by the data processing device 7 for the presence of a pattern. The group of values 11 may comprise all of the values ascertained at the measurement points 3 of a measurement section 2 or may be a subset thereof.

If a pattern is identified in the group of values 11, the data processing device 7 may take this pattern as a basis for determining the likelihood of the presence of a leak 8 in the relevant measurement section 2 of the object 1 carrying a flow. Such a pattern in the data of the group of values 11 is identified in particular by way of an appropriate algorithm of a detection routine, similarly to in the case of digital image recognition.

The data processing device 7 is preferably designed to execute a classification algorithm and applies such an algorithm to the group of values 11. An identified pattern is therefore classified in respect of its type, nature and/or qualities.

As an alternative or in addition to such a classification algorithm, a pattern analysis algorithm may also be applied to the group of values 11 by the data processing device 7. Such a pattern analysis algorithm may interpret the significance of the identified pattern. This allows a statement to be made regarding what real event is represented by the pattern that occurs in the ascertained values.

In one preferred configuration, the data processing device 7 accesses a database in which an identified pattern may be stored as dataset 12. The same applies to the ascertained values, or the group of values 11. In particular, the identified pattern, the group of values 11 and/or a specific really occurring event, for example the presence of a leak 8, may be linked with one another and stored in the database as datasets 12 or as a joint dataset 12.

A comparison of the pattern in the analyzed group of values 11 with one or more patterns stored in datasets 12 of the database allows the identified pattern to be quickly assigned to a group of events in the simplest case. Such a comparison in the manner of a fingerprint is possible in particular if the data processing device 7 has access to datasets 12 that are classified in respect of the stored patterns and/or the associated events and the identified pattern may be uniquely assigned to one of these classes on the basis of its characteristics.

Alternatively or additionally, a characteristic, or idealized, pattern may also be used as a criterion that is taken as a basis for determining the likelihood of a presence of a leak 8 in the measurement section 2 under consideration by way of a comparison with the pattern identified in the group of values 11. A characteristic pattern of this kind may be based on measured values from one or more measurements relating to an event that has really occurred or else may be based on simulated values.

If there is a sufficient degree of match between the identified pattern and the characteristic pattern, i.e if a defined threshold value is exceeded, the criterion for the presence of a leak 8 may be rated as met, so that appropriate measures may be taken.

A configuration of the method according to the invention in which the data processing device 7 applies a learning algorithm to the ascertained values, or to the group of values 11, in order to identify a pattern is particularly preferred. Alternatively or additionally, an algorithm with learning capability may also be used to serve as a classification algorithm and/or as a pattern analysis algorithm. Compared to the previously described identification and evaluation of a pattern in the group of values 11 on the basis of essentially firmly prescribed criteria, an algorithm with learning capability has the advantage that it becomes more powerful and more reliable over time as a result of appropriate training with suitable data. There is therefore a decrease in susceptibility to error in regard to the incorrect interpretation of a pattern as an indicator of a leak 8 (false positive) and in regard to the nondetection of an existing leak 8 on the basis of the ascertained values (false negative).

Such a learning algorithm is preferably trained by way of datasets 12 that relate to real events, in particular the presence of a leak 8, or were measured when the relevant event occurred. Such data ultimately model reality in the best way possible, so that the trained learning algorithm is ultimately tailored to the specific patterns that may arise in the ascertained values in individual cases under real conditions.

Alternatively or additionally, the learning algorithm may also be trained using simulated values, or model data. This allows the algorithm to have components added that relate to idealized conditions.

For optimum detection performance in regard to the identification, classification and/or interpretation of patterns in a group of values 11, training the algorithm with a combination of real and simulated, or ideal, data may sometimes be particularly expedient.

In a more preferred configuration, the data processing device 7 may use an in particular iterative method for modeling values. This involves using in particular a method for forward modeling in order to ascertain values that may be expected under certain work and/or ambient conditions.

The values ascertained by way of such a modeling method may be employed in different ways for the method according to the invention. By way of example, the parallel application of such a modeling method allows independent verification of the measured values and/or of a pattern that has emerged in the values.

Data obtained by way of the forward modeling are furthermore also suitable for training a learning algorithm.

Preferably, a comparison of the evaluation of real data with the modeling of a specific trend for the system allows possible artefacts of the pattern identification to be determined and in particular corrected. In this way, it is preferably possible to compensate for shortcomings of the learning algorithm that emerge in this context and may be conditional, inter alia, on less-than-optimum prioritization during the training of the algorithm. Repeated use of this approach therefore continually improves the reliability of the pattern identification.

In addition, it is possible for the pattern-recognition-based method according to the invention to be serially linked with a corresponding method for modeling data on the basis of measured values. This allows for example a future trend to be modeled on the basis of known or measured starting parameters and the risk of an imminent structural failure of the object 1 carrying a flow to be assessed in the results thus obtained by identifying patterns that occur.

In addition to taking into consideration datasets 12 of a database in the manner explained above, it is also possible to include data from external sources, in particular generally available data, in different ways. These data are in particular added to the group of values 11 and/or linked with the group of values 11 in order to be taken into consideration for the evaluation. However, external data of this kind may also be used for a modeling and/or for training a learning algorithm. By way of example, the data may relate to the weather, the geological composition of the ground, the in particular agricultural use of areas or the like.

The evaluation of the ascertained values, or of the group of values 11 formed therefrom, involves identifying a pattern in the group of values 11 and, if necessary, interpreting the pattern or otherwise associating it with a specific event or an event likelihood. Preferably, the data processing device 7 then generates an appropriate output 13 conveying the result of the preceding analysis, or of the method used, for a user.

The output 13 may be provided in different ways, preferably visually, audibly and/or in text form. In particular, the output 13, as shown in FIG. 3, may comprise a warning about the presence of a leak 8. Furthermore, a status report may be generated, for example.

With regard to an automatically operating system, it is alternatively or additionally also possible for remedial measures relating to the output 13 to be immediately taken, for example for an alert to be delivered to maintenance and/or service personnel.

It is self-evident in this case that it is fundamentally also possible to combine different outputs 13 or reactions to the result of the analysis by the method.

LIST OF REFERENCE SIGNS:

1 object carrying a flow
2 measurement section
3 measurement point
4 flowmeter
5 pressure sensor
6 temperature sensor
7 data processing device
8 leak
9 soil
10 relay station
11 group of values
12 dataset
13 output

The invention claimed is:

1. A method for leakage detection on a pipeline carrying a flow of a medium, the method comprising:

ascertaining a value for a change in a flow rate of the medium, for a pressure change in the medium, and a temperature value change at each of a plurality of measurement points on a contiguous section of pipeline carrying the flow of the medium to known tapping points, wherein at least part of the contiguous section of the pipeline is buried in the ground, wherein a length of the contiguous section of the pipeline is such that at least some of the plurality of measurement points are outside a same measurement housing, and wherein the ascertained values are recorded and statistically evaluated by a data processing device;

identifying, by the data processing device, a pattern in a group of values that is formed from the ascertained values and from data, obtained via an external source, that describes geological composition of the ground surrounding the part of the contiguous section of the pipeline; and determining, by the data processing device and based on the identified pattern, a likelihood of a presence of a leak in the contiguous section of the pipeline at a location between a first measurement point on the contiguous section of the pipeline and a second measurement point on the contiguous section of the pipeline by:

applying a classification algorithm and a pattern analysis algorithm to the identified pattern; and applying a learning algorithm, that comprises the classification algorithm and the pattern analysis algorithm, to the group of values, wherein output of the learning algorithm is indicative of the likelihood of the presence of the leak, wherein the learning algorithm is trained using stored and simulated values before being applied to the ascertained values and/or the group of values, and wherein the stored and simulated values are associated with an actual and a simulated presence of a leak on the contiguous section of the pipeline.

2. The method as claimed in claim 1, wherein the identified pattern is stored as a dataset in a database and/or is assigned to a dataset stored in a database.

3. The method as claimed in claim 1, wherein the identified pattern is compared with one or more stored patterns.

4. The method as claimed in claim 1, wherein a characteristic pattern serves as a criterion for the presence of a leak in the contiguous section of the pipeline.

5. The method as claimed in claim 1, wherein the value for the change in the flow rate of the medium, the value for the pressure change in the medium, and the temperature value change are each ascertained noninvasively.

6. The method as claimed in claim 1, wherein the change in the flow rate is measured by an acoustic method.

7. The method as claimed in claim 1, wherein data concerning the weather in the surroundings of the contiguous section of the pipeline and/or of a measurement point are processed by the data processing device and are linked with the group of values and/or added to the group of values.

8. The method as claimed in claim 7, wherein the data from the external source includes data relating to the agricultural use of areas surrounding the part of the contiguous section of the pipeline.

9. The method as claimed in claim 1, wherein the ascertained values from different measurement points are transmitted to a central data processing device.

10. The method as claimed in claim 1, wherein the group of values includes values for the change in the flow rate of the medium, the pressure change in the medium, and the temperature value change at each of the plurality of measurement points.

11. The method as claimed in claim 1, wherein the length of the contiguous section of the pipeline is such that the first measurement point and the second measurement point are in different weather zones.

12. The method as claimed in claim 1, wherein the known tapping points are outside of a portion of the contiguous section of the pipeline that extends from the first measurement point to the second measurement point.

13. A non-transitory computer program product comprising instructions for determining a likelihood of a presence of a leak on a pipeline carrying a flow of a medium, wherein the instructions are for causing a data processing device to:

ascertain a value for a change in a flow rate of the medium, for a pressure change in the medium, and for a temperature value change at each of a plurality of measurement points on a contiguous section of the pipeline carrying the flow of the medium to known tapping points, wherein at least part of the contiguous section of the pipeline is buried in the ground, wherein a length of the contiguous section of the pipeline is such that at least some of the plurality of measurement points are outside of a same measurement housing, identify a pattern in a group of values formed from the ascertained values and from data, obtained via an external source, that described geological composition of the ground surrounding the part of the contiguous section of the pipeline;

determine, based on the identified pattern, a likelihood of a presence of a leak in the contiguous section of the pipeline at a location between a first measurement point on the contiguous section of the pipeline and a second measurement point on the contiguous section of the pipeline by:

applying a classification algorithm and a pattern analysis algorithm to the identified pattern; and applying a learning algorithm, that comprises the classification algorithm and/or the pattern analysis algorithm, to the group of values, wherein output of the learning algorithm is indicative of the likelihood of the presence of the leak, wherein the learning algorithm is trained using stored and simulated values before being applied to the group of values, and wherein the stored and simulated values are associated with an actual and/or a simulated presence of a leak on the contiguous section of the pipeline.

* * * * *